US 8,479,284 B1

(12) United States Patent
Cooley et al.

(10) Patent No.: US 8,479,284 B1
(45) Date of Patent: Jul. 2, 2013

(54) REFERRER CONTEXT IDENTIFICATION FOR REMOTE OBJECT LINKS

(75) Inventors: Shaun Cooley, El Segundo, CA (US); Zulfikar Ramzan, Cupertino, CA (US)

(73) Assignee: Symantec Corporation, Mountain View, CA (US)

( * ) Notice: Subject to any disclaimer, the term of this patent is extended or adjusted under 35 U.S.C. 154(b) by 1065 days.

(21) Appl. No.: 11/961,495

(22) Filed: Dec. 20, 2007

(51) Int. Cl.
*H04L 29/06* (2006.01)

(52) U.S. Cl.
USPC .............................. 726/22; 726/24; 707/726

(58) Field of Classification Search
None
See application file for complete search history.

(56) References Cited

U.S. PATENT DOCUMENTS

| | | | |
|---|---|---|---|
| 6,418,433 B1 | 7/2002 | Chakrabarti et al. | |
| 6,725,214 B2 | 4/2004 | Garcia-Chiesa | |
| 6,751,612 B1 | 6/2004 | Schuetze et al. | |
| 7,028,039 B2 | 4/2006 | Burrows et al. | |
| 7,383,282 B2* | 6/2008 | Whitehead et al. | 707/700 |
| 7,447,678 B2 | 11/2008 | Taylor et al. | |
| 7,496,962 B2* | 2/2009 | Roelker et al. | 726/23 |
| 7,516,184 B2 | 4/2009 | Thomas | |
| 7,584,194 B2 | 9/2009 | Tuttle et al. | |
| 7,640,590 B1 | 12/2009 | McCorkendale et al. | |
| 7,665,131 B2* | 2/2010 | Goodman et al. | 726/13 |
| 7,672,943 B2 | 3/2010 | Wong et al. | |
| 7,739,253 B1 | 6/2010 | Yanovsky et al. | |
| 7,747,603 B2 | 6/2010 | Apparao et al. | |
| 7,769,740 B2 | 8/2010 | Martinez et al. | |
| 7,908,328 B1* | 3/2011 | Hulten et al. | 709/206 |
| 7,966,337 B2 | 6/2011 | Blackman et al. | |
| 7,979,417 B1 | 7/2011 | Bharat et al. | |
| 8,010,609 B2* | 8/2011 | Cowings et al. | 709/206 |
| 8,020,206 B2 | 9/2011 | Hubbard et al. | |
| 8,090,781 B2* | 1/2012 | Sano | 709/206 |
| 8,180,761 B1* | 5/2012 | Cooley et al. | 707/709 |
| 2002/0059221 A1* | 5/2002 | Whitehead et al. | 707/5 |
| 2002/0099723 A1 | 7/2002 | Garcia-Chiesa | |
| 2002/0138509 A1 | 9/2002 | Burrows et al. | |
| 2003/0097591 A1 | 5/2003 | Pham et al. | |
| 2004/0088570 A1* | 5/2004 | Roberts et al. | 713/201 |
| 2004/0093513 A1* | 5/2004 | Cantrell et al. | 713/201 |
| 2004/0148281 A1 | 7/2004 | Bates et al. | |
| 2005/0015455 A1* | 1/2005 | Liu | 709/207 |
| 2006/0031359 A1* | 2/2006 | Clegg et al. | 709/206 |

(Continued)

OTHER PUBLICATIONS

Burnett, M., "Forensic Log Parsing with Microsoft's LogParser," SecurityFocus, Jul. 18, 2003, [online] [Retrieved on Apr. 9, 2008] Retrieved from the Internet<URL:http://www.securityfocus.com/infocus/1712>.

(Continued)

*Primary Examiner* — Nathan Flynn
*Assistant Examiner* — Michael R Vaughan
(74) *Attorney, Agent, or Firm* — Fenwick & West LLP

(57) ABSTRACT

A computer, computer program product, and method identify referrer context information associated with a remote object link. A network inspection module monitors network traffic and a remote object link identification module identifies remote links and their associated referrer context information. A link storage module stores the referrer context information along with the associated link. A look up module looks up the referrer context information in response to a request for a source of a link. The referrer context information is an important security resource in identifying the true source of a threat, and in avoiding future attacks. In addition, it allows for a more complete picture of how a link moves from one client to another by tracking how the link was sent and received.

11 Claims, 4 Drawing Sheets

U.S. PATENT DOCUMENTS

| | | | |
|---|---|---|---|
| 2006/0230011 A1 | 10/2006 | Tuttle et al. | |
| 2006/0253584 A1 | 11/2006 | Dixon et al. | |
| 2007/0006308 A1* | 1/2007 | Desouza et al. | 726/24 |
| 2007/0143469 A1* | 6/2007 | Adams et al. | 709/224 |
| 2007/0258437 A1* | 11/2007 | Bennett | 370/352 |
| 2008/0010683 A1 | 1/2008 | Baddour et al. | |
| 2008/0189263 A1 | 8/2008 | Nagle | |
| 2008/0256065 A1 | 10/2008 | Baxter | |
| 2008/0282080 A1* | 11/2008 | Hyndman et al. | 713/150 |
| 2009/0006371 A1 | 1/2009 | Denoue et al. | |
| 2009/0113547 A1* | 4/2009 | Higashikado | 726/23 |
| 2009/0132524 A1 | 5/2009 | Stouffer et al. | |
| 2009/0216758 A1 | 8/2009 | Tuttle et al. | |
| 2009/0299880 A1 | 12/2009 | Stoppelman | |
| 2010/0076954 A1 | 3/2010 | Dulitz et al. | |
| 2010/0077483 A1* | 3/2010 | Stolfo et al. | 726/24 |
| 2010/0268701 A1 | 10/2010 | Zhang et al. | |
| 2010/0293116 A1 | 11/2010 | Feng et al. | |
| 2011/0030058 A1 | 2/2011 | Ben-Itzhak et al. | |
| 2011/0087648 A1 | 4/2011 | Wang et al. | |
| 2011/0252478 A1 | 10/2011 | Hubbard et al. | |
| 2012/0084866 A1* | 4/2012 | Stolfo | 726/25 |

OTHER PUBLICATIONS

First Action Interview—Office Action, U.S. Appl. No. 11/965,526, Jun. 28, 2010, 8 pages.

Preinterview First Office Action, U.S. Appl. No. 11/965,526, May 14, 2010, 6 pages.

United States Office Action, U.S. Appl. No. 11/965,526, Oct. 15, 2010, 17 pages.

United States Office Action, U.S. Appl. No. 11/965,526, Sep. 9, 2011, 19 pages.

\* cited by examiner

US 8,479,284 B1

REFERRER CONTEXT IDENTIFICATION FOR REMOTE OBJECT LINKS

BACKGROUND OF THE INVENTION

1. Field of the Invention

This invention pertains in general to computer security and in particular to identifying referrer information for a remote object link received via a network.

2. Description of the Related Art

Applications executed on modern computers are often susceptible to a wide variety of network-based attacks. Web browsers, for example, are particularly susceptible to attacks because browsers receive large amounts of content from the Internet. Other types of applications are also vulnerable. For example, email programs and even word processors provide interfaces for executing network-based content.

Malicious attackers can compromise such applications by crafting specially-formulated input that exploits vulnerabilities in the programs. This input contains code that, when executed, gives the attackers control over the applications and allows them to perform malicious acts such as capturing keystrokes, sending messages on the network, deleting files, installing malicious software (malware) such as spyware and adware, etc.

Many such malicious attacks are received at the computer as remote object links in network traffic received via various protocols, such as email, instant messaging, or HTTP associated with a website. Traditional threat analysis, detection, repair, and avoidance systems lack the ability to reliably identify the referrer, or sender, to a remote object associated with a link received in the network traffic.

BRIEF SUMMARY

The above and other needs are met by a computer, computer program product, and method for identifying referrer context information associated with a remote object link. Embodiments of the computer and computer program product comprise a network inspection module that monitors network traffic, a remote object link identification module that identifies remote links in traffic and the associated referrer context information, and a look up module for looking up referrer context information in response to a request for a source of a link. The embodiments also comprise a link storage module that stores the referrer context information along with the associated link. Referrer context information includes information allowing the entity that provided the link to be ascertained. The referrer context information is an important resource in identifying the true source of a threat, and in avoiding future attacks. In addition, it allows for a more complete picture of how a link moves from one client to another by tracking how the link was received and sent.

Embodiments of the method comprise identifying remote links in network traffic and their associated referrer context information, storing the referrer context information, and looking up the referrer context information in response to a request for a source of a link.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
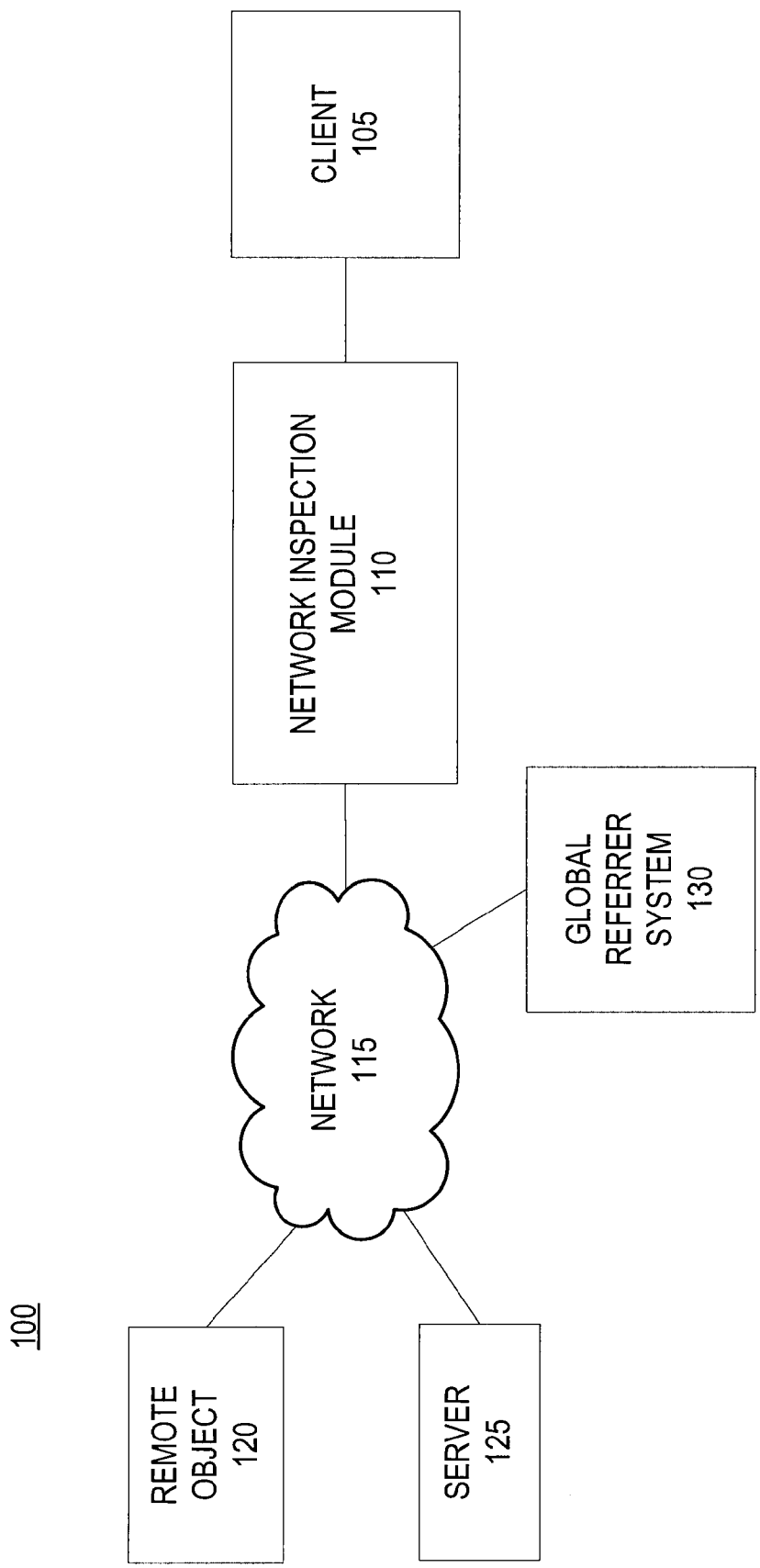
FIG. 1 is a high-level block diagram of a computing environment according to one embodiment.

FIG. 1 is a high-level block diagram of a computing environment 100 according to one embodiment. FIG. 1 illustrates a client 105 connected via a network inspection module 110, to a network 115 for, among other things, accessing a remote object 120. The client 105 also may communicate with a server 125 and a global referral system 130 via the network 115. Only one client 105, one remote object 120, and one server 125 are shown in FIG. 1 in order to simplify and clarify the description.

Embodiments of the computing environment 100 can have thousands or millions of clients 105, remote objects 120, and servers 125 connected to the network 115.

In one embodiment, the client 105, or client device, is a computer used by one or more users to connect to the network 115 and various network entities, such as remote objects 120, servers 125, and a global referrer system 130. The client 105, for example, can be a personal computer or other network-capable device like a personal digital assistant (PDA), mobile telephone, pager, or television "set-top box." For purposes of this description, the term "client" also includes computers such as servers and gateways that have the characteristics described herein.

The client 105 executes one or more applications such as a web browser, email program, word processor, spreadsheet, image viewer, or music player. The application has an interface for executing content received via the network 115, stored on a local disk, or located elsewhere. In a common example, the application is a web browser such as MICROSOFT INTERNET EXPLORER or MOZILLA FIREFOX that includes functionality for downloading web pages, e.g., from a server 120 and executing scripts written in VBScript or JavaScript contained therein. Some content downloaded and/or accessed by an application contains malicious code that attempts to exploit a vulnerability in the application or otherwise attack the client 105.

A network inspection module 110 monitors network traffic to and from the client 105, for all ports or a subset thereof. The network inspection module 110 may be a network proxy, local or remote to the client 105, or may be a network appliance. Thus, according to one embodiment, the network inspection module 110 may be integrated with client 105. Alternatively, the network inspection module 110 may be implemented as multiple plug-ins to network applications, such as to a web browser, email client, news reader, RDF Site Summary (RSS) feed hander, IM client, and the like. The network inspection module 110 captures network traffic and hands it off to a global referrer system 130.

A global referrer system 130 detects links to remote objects 120 within network traffic received from the network inspection module 110 and identifies context information about the referrers of the links. For example, for a link received at (or sent by) a client 105 via email, the global referrer system 130 identifies the link in the incoming (outgoing) email and identifies and stores referrer context information for the received (sent) link. Referrer context information, in a general sense, is information allowing the entity that provided—or received—the link to be ascertained. Thus, the referrer context information may include transmission context information as well, e.g., for links sent from the client device. As used herein, referrer context information includes information about the context in which the link was sent or received, e.g., if sent or received via a server, such as for SMS and newsgroup messages, identification of the server. Referrer context information also includes, for some protocols, a user identification, e.g., a user name or email address. For HTTP, referrer context information includes a URL. Thus, the content of the referrer context information is specific to the particular protocol in which the link was sent or received. For a link sent or received via Instant Messaging (IM) or Internet Relay Chat (IRC), the referrer context information includes a server and a user name; for Network News Transfer Protocol (NNTP), the referrer context information includes a server, a newsgroup, a posted, and a poster; for email, the referrer context information includes an email address (i.e., an email name and email domain in the form of emailname@emaildomain) and for a link sent or received via HTTP, the referrer context information includes a URL. Thus, referrer context information may include a direction associated with the network traffic (e.g., inbound or outbound), a protocol, the remote link itself, the referrer (sender) and recipient (receiver), transmission associated data (server, etc.), time of transmission, time of receipt, and the like. When referrer information associated with the link is request by the client 105 or a third party, the global referrer system 130 allows for a look up of the stored referrer context information.

The network 115 represents the communication pathways between the client 105 and various network entities such as remote objects 120, servers 125, and the global referrer system 130. In one embodiment, the network 115 is the Internet. The network 115 can also utilize dedicated or private communications links that are not necessarily part of the Internet. In one embodiment, the network 115 uses standard communications technologies and/or protocols such as Ethernet, 802.11, etc. Similarly, the networking protocols used on the network 115 can include the transmission control protocol/Internet protocol (TCP/IP), the hypertext transport protocol (HTTP), the simple mail transfer protocol (SMTP), the file transfer protocol (FTP), etc. The data exchanged over the network 115 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

A remote object 120 is content, e.g., web content, to which a link points, such as a webpage, a downloadable file, scripts written in interpreted languages such as VBScript and JavaScript, executable programs, images, music, multimedia content, and the like. In some instances, a remote object may include malicious code posing a threat to the client 105. For example, the remote object 120 may be a seemingly-innocuous web page that includes a malicious script. The script, when executed by the client 105, attempts to compromise the client 105, e.g, by exploiting a vulnerability of the client 105 or its applications.

A server 125 provides content, including remote objects 120, to the client 105 via the network 115. In one embodiment, the server 125 is a web server that provides content such as HTML web pages. In other embodiments, the server 125 is a different type of server, such as a server dedicated to providing a specific type of content. In some instances, the server 125 may surreptitiously provide malicious code to the client 105, for example, as contained in a remote object 120 as discussed above.

Figure 2:
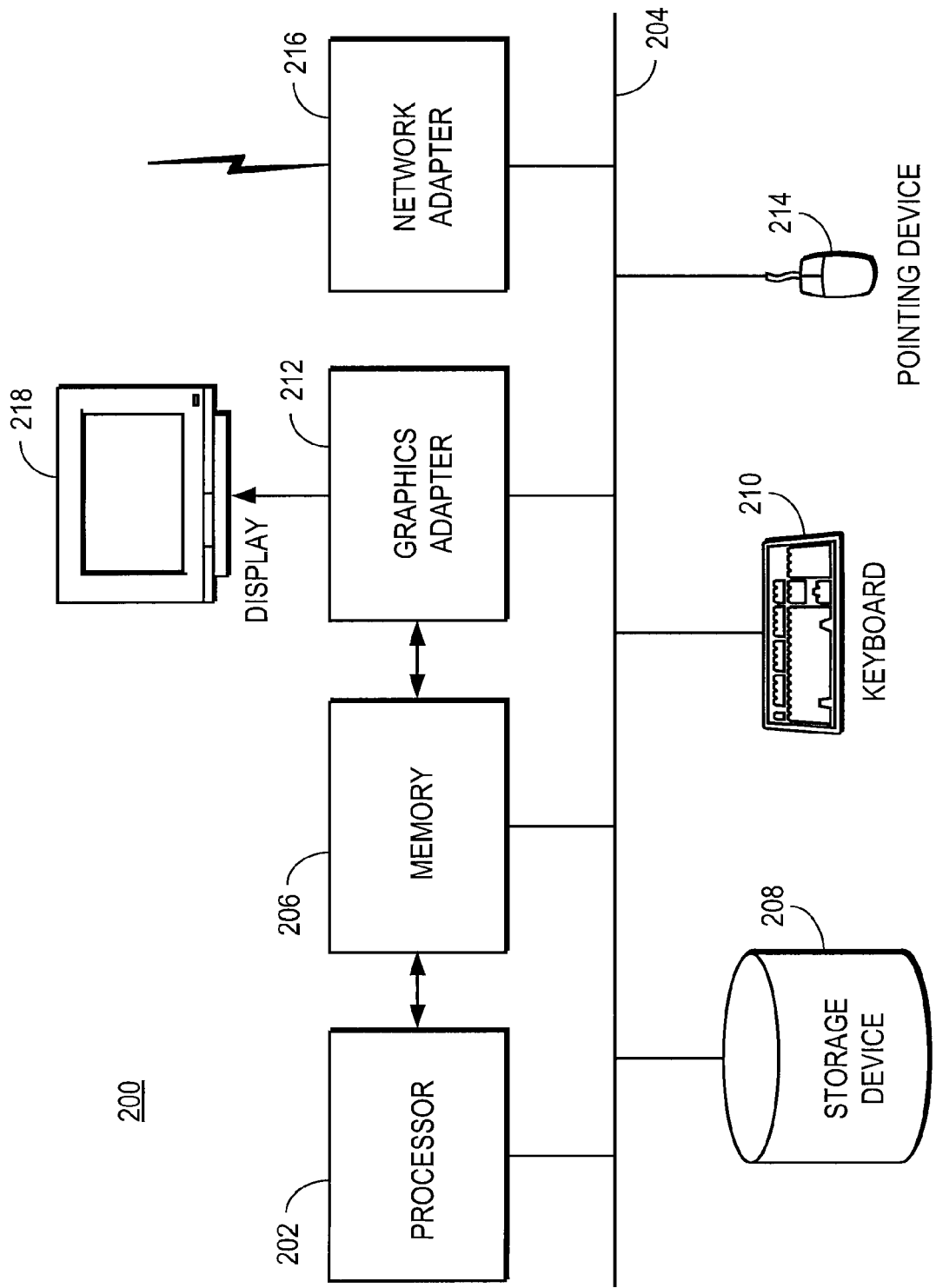
FIG. 2 is a high-level block diagram illustrating a typical computer for use as for use as a client or server according to one embodiment.

FIG. 2 is a high-level block diagram illustrating a typical computer 200 for use as a client 105 or server 125, or for use as a network appliance or proxy such as network inspection module according to one embodiment. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The types of computers 200 utilized by the entities of FIG. 1 can vary depending upon the embodiment and the processing power utilized by the entity. For example, a client 105 that is a mobile device such as a PDA typically has limited processing power, a small display 218, and might lack a pointing device 214. The server 125, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

In addition, this description uses the term "application" to refer to a program executed by the computer 200. The application is formed of one or more files that typically reside on the storage device 208 and are loaded into memory 206 when executed. At least one of the files loaded into memory 206 is referred to as the "executable image" and is executed as a process. The computer 200 has a state that is defined by the content of the memory 208, values stored in registers of the processor 202, and/or other data within the computer at a given instant.

Figure 3:
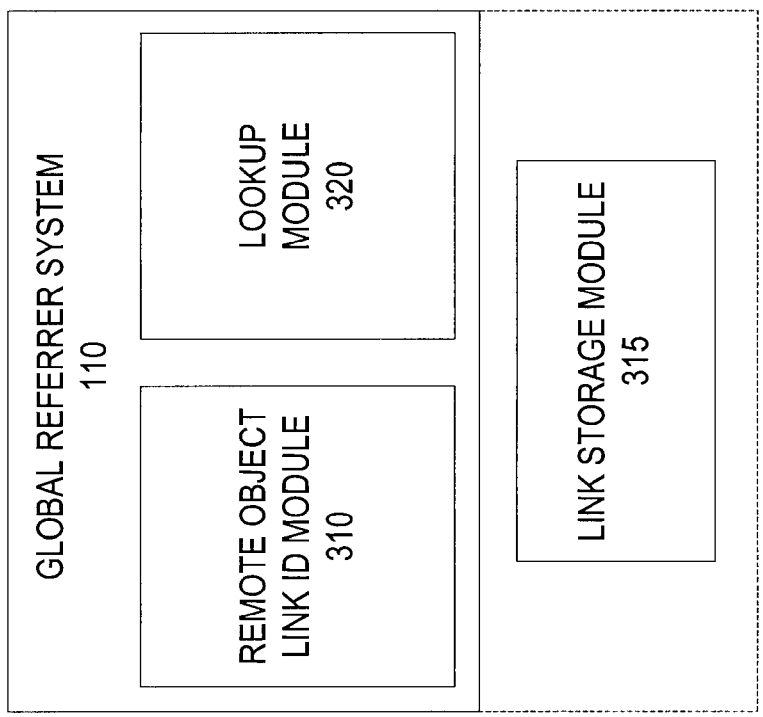
FIG. 3 is a block diagram illustrating a detailed view of a global referrer system according to one embodiment.

FIG. 3 is a block diagram illustrating a detailed view of a global referrer system 130 according to one embodiment. In some embodiments the global referrer system 130 is incorporated into an operating system executing on the client 105 while in other embodiments the global referrer system 130 may be a standalone application or part of another product according to various embodiments. As shown in FIG. 3, the global referrer system 130 itself includes multiple modules. Those of skill in the art will recognize that other embodiments of the global referrer system 130 can have different and/or other modules than the ones described here, and that the functionalities can be distributed among the modules in a different manner.

The global referrer system 130 includes a remote object link identification module 310, a link storage module 315, and a look up module 320 according to one embodiment.

A remote object link identification module 310 identifies remote links in network traffic, e.g., links to remote objects 120 received from the network inspection module 110. The remote links may be Uniform Resource Locators (URLs) for identifying remote objects 120 on the Internet or network 115 or Universal Naming Conventions (UNCs) for describing the location of a network resource, such as a shared file, directory, or printer. However, the remote links may be any string or binary data that represents a location of a remote object 120. The remote object link identification module 310 is configured to identify associated referrer context information for the remote links from a plurality of protocols. The protocols include, but are not limited to, standard and secure Hypertext Transfer Protocol (HTTP, HTTPs), Short Message Service (SMS), NNTP, Network Time Protocol (NTP), Simple Network Management Protocol (SNMP), Transmission Control Protocol (TCP), User Datagram Protocol (UDP), Internet Control Message Protocol (ICMP), Venturi Transport Protocol (VTP), Real-time Transport Protocol (RTP), Stream Control Transmission Protocol (SCTP), and Telnet.

The remote object link identification module 310 uses pattern matching to locate remote links in the network traffic. In one embodiment, the remote object link identification module 310 uses regular expression searching may be used to identify remote links in the network traffic.

In addition to identifying the links themselves, the remote object link identification module 310 extracts referrer context information associated with the referrer that provided the remote link for an incoming link. The referrer context information is specific to the protocol that the remote link was found on. For example, for a link received via HTTP, the referrer context information includes a URL; for Instant Messaging (IM) or Internet Relay Chat (IRC), the referrer context information includes a server and a user name; and for Network News Transfer Protocol (NNTP), the referrer context information includes a server, a newsgroup, a posted, and a poster. Thus, for some protocols, the referrer context information includes an identifier of the referrer, for example a user name for IM or IRC.

For remote object source protocols that result in a file being stored on at least one storage medium, source information may be stored in an alternate file stream or as attributes attached to or associated with the file. For other remote source protocols, a custom source tagging process may be necessary to associate the remote object 120 with the referrer context information. A source tag, as used herein, includes the referrer context information to be associated with the remote object link, and is the manner in which this information is tied to the link.

The remote object link identification module 310 also identifies links in outbound network traffic. In this context, the referrer context information may include information associated with the recipient of the remote link. Thus, referrer context information may include a direction associated with the network traffic (e.g., inbound or outbound), a protocol, the remote link itself, the referrer (sender) and recipient (receiver), time of transmission, time of receipt, and the like.

Once a remote link and associated referrer context information are identified, the remote object link identification module 310 sends the link and the referrer context information to a link storage module 315.

A link storage module 315 stores remote links and associated referrer context information received from the remote object link identification module 310. The link storage module 315 is a relational database according to one embodiment. Alternatively, the link storage module 315 may be an Extensible Markup Language (XML) file, text file, or any other data storage module. In some embodiments, the link storage module 315 is integrated with the other portions of the global referrer system 130 on the same device, e.g., client device or network proxy. Alternatively, the link storage module 315 may be implemented on a separate device from the monitoring functionality of the network inspection module 110, as indicated by the dashed line surrounding the link storage module.

A look up module 320 provides access to the remote links and referrer context information stored in the link storage module 315. Specifically, in response to a request for the source of a remote link, the look up module 320 accesses the link storage module 315 and returns the remote link referrer context information. The request for the referrer context information may include source tag information as described herein. Alternatively, the source information for the remote object 120 may be stored locally, for example in an alternate source stream in the case of downloading a file from a website using a Windows operating system. The request results from an attack on the client 105, or detection of malicious code associated with a remote object 120. Alternatively, the request may result from detection of an outbound request for the remote object 120, e.g., by the client 105, using the associated remote link. The referrer context information retrieved can then be used for threat detection or other means requiring source data.

The above modules 310-320 need not be discrete modules. The configuration shown in FIG. 3 is meant only by way of example and not limitation; other configurations are within the scope of the present invention.

Figure 4:
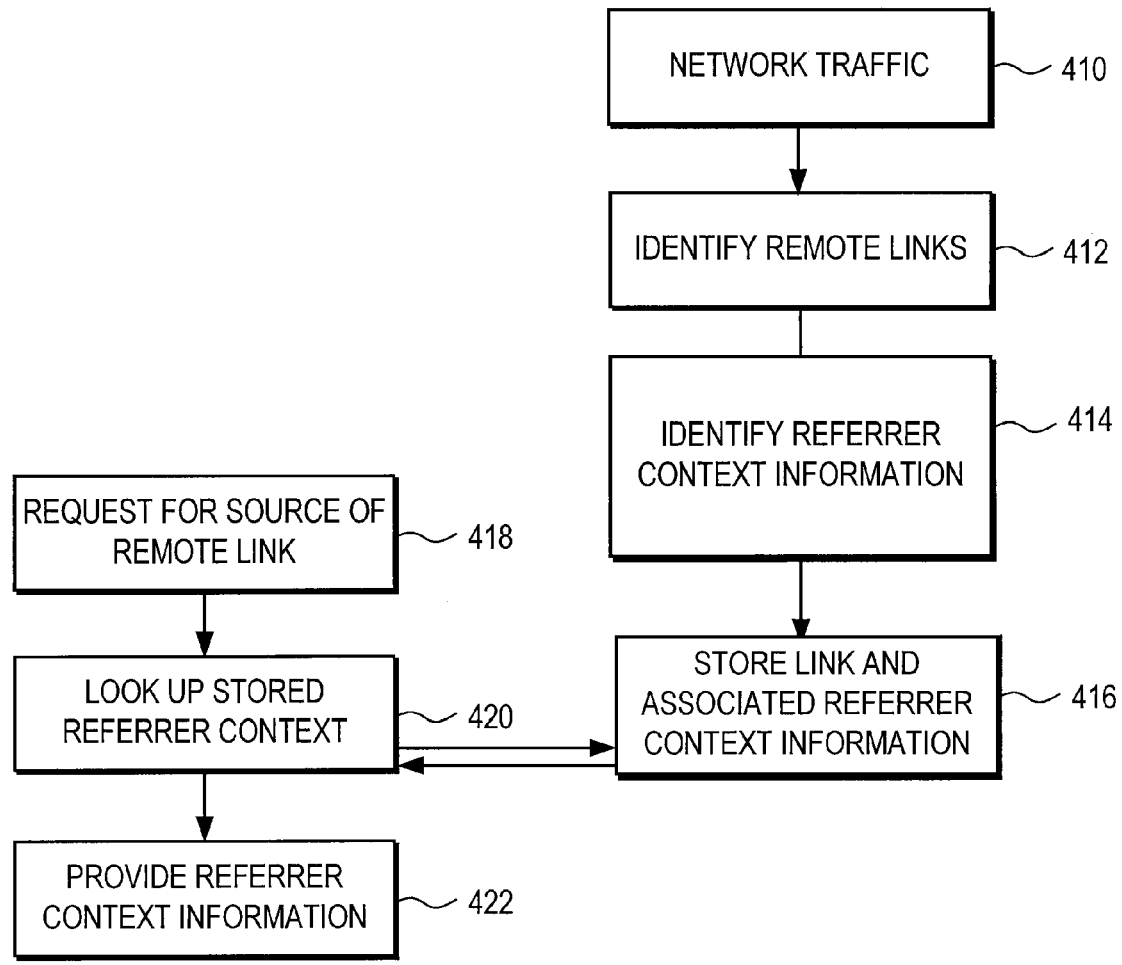
FIG. 4 is a flowchart illustrating steps performed by a global referrer system according to one embodiment.

FIG. 4 is a flowchart illustrating steps performed by a global referrer system 130 according to one embodiment. Other embodiments perform the illustrated steps in different orders, and/or perform different or additional steps. Moreover, some or all of the steps can be performed by modules other than those referenced.

A network inspection module 110 monitors 410 s network traffic as it arrives at, or is transmitted from, a client 105, either as a remote or local network proxy or network appliance. Remote links in network traffic 410, e.g., links to remote objects 120, are identified 412 by a remote object link identification module 310. The remote links may be URLs, UNCs, or any string or binary data that represents a location of a remote object 120. The remote object link identification module 310 uses regular expression searching or any other pattern matching technique to identify 412 the remote links in the network traffic 410. For example, a user of client device 105 receives an IM text message from a friend, Bob, with a link to a remote object 120. The remote object link identification module 310 identifies 412 the remote link in the message.

Referrer context information also is identified 414 for the remote link by the remote object link identification module 310. The referrer context information is specific to the protocol on which the remote link was found, however, the remote object link identification module 310 can identify 414 referrer context information from any of a number of protocols. For some remote source protocols, the identifying 414 further includes a custom source tagging process for associating the remote object 120 with the referrer context information. In some embodiments, the time of transmission and the time of receipt of the remote link also are identified. The referrer context information is stored 416, along with the link, at a link storage module 315. Continuing with the above example, the remote object link identification module 310 identifies 414 the referrer context from the message received from Bob. In this case, the referrer context information includes Bob's user name, "IMTxtR," and the server Bob used, "CoServ1."

Some time later, a request 418 for the source of a remote link is received, from the client 105 or from a third party, e.g., via the network 115. The request for the referrer context information may include source tag information. The request may result from, e.g., an attack on the client 105, or detection of malicious code associated with a remote object 120. Alternatively, the request may result from detection of an outbound request for the remote object 120, e.g., by the client 105, for accessing the associated remote link.

In response to the request 418, the look up module 320 looks up 420 the stored referrer context information associated with the link, stored in the link storage module 315. The referrer context information is provided 422 to the requestor. The retrieved referrer context information can then be used for threat detection or other means requiring source data.

The description in the specification is included to illustrate the operation of certain embodiments, is not all inclusive, and is not meant to limit the scope of the invention. The scope of the invention is to be limited only by the following claims. In particular, many additional features and variations will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The invention claimed is:

1. A method of identifying referrer context information for links to remote objects, comprising:
    monitoring network traffic received at a client device in a plurality of different protocols;
    identifying in the network traffic links to remote objects, the links received via the plurality of different protocols;
    identifying, using pattern matching, referrer context information within the monitored network traffic that is associated with the links to the remote objects, wherein types of referrer context information are specific to the protocols in which the links to the remote objects were received, different types of referrer context information are identified for links to remote objects received via different protocols, and the referrer context information comprises information allowing ascertainment of referrers that provided the network traffic containing the links to the remote objects to the client device;
    storing the links to the remote objects and the associated referrer context information; and
    responsive to receiving a request for a source of a remote object triggered by detection of malicious code associated with the remote object, looking up stored referrer context information associated with a link to the remote object.

2. The method of claim 1, wherein the information allowing ascertainment of referrers that provided the network traffic containing the links to the remote objects to the client device comprises a user identification for a referrer of a link.

3. The method of claim 1, further comprising:
    monitoring network traffic transmitted from the client device in the plurality of different protocols;
    identifying in the network traffic transmitted in the plurality of different protocols links to remote objects;
    wherein identifying referrer context information further comprises identifying transmission context information associated with transmission of the links to the remote objects from the client device.

4. The method of claim 3, further comprising in response to the request for the source of the remote object, looking up stored transmission context information associated with a transmission of the link to the remote object from the client device.

5. The method of claim 1, wherein a protocol in which network traffic is received at the client device results in a file being stored at the client device, wherein the referrer context information for the file is stored in an alternate file stream or as attributes associated with the file, and wherein different types of referrer context information are stored for network traffic received via different protocols.

6. A non-transitory computer-readable storage medium having computer program instructions embodied therein for identifying referrer context information for links to remote objects, comprising:
    a network inspection module configured to monitor network traffic received at a client device in a plurality of different protocols;
    a remote object link identification module configured to identify in the network traffic links to remote objects, the links received via the plurality of different protocols, and to identify, using pattern matching, referrer context information within the monitored network traffic that is associated with the links to the remote objects, wherein types of referrer context information are specific to the protocols in which the links to the remote objects were received, different types of referrer context information are identified for links to remote objects received via different protocols, and the referrer context information comprises information allowing ascertainment of referrers that provided the network traffic containing the links to the remote objects to the client device;
    a link storage module configured to store the links to the remote objects and the associated referrer context information; and
    a look up module configured to look up stored referrer context information associated with a link to a remote object in response to receiving a request for a source of the remote object triggered by detection of malicious code associated with the remote object.

7. The computer-readable storage medium of claim 6, wherein the information allowing ascertainment of referrers that provided the network traffic containing the links to the remote objects to the client device comprises a user identification for a referrer of a link.

8. The computer-readable storage medium of claim 6, wherein:
    the network inspection module is further configured to monitor network traffic transmitted from the client device in the plurality of different protocols; and
    the remote object link identification module is further configured to identify in the network traffic transmitted via the plurality of different protocols links to remote objects and to identify referrer context information associated with the links to the remote objects and specific to the protocol in which the links to the remote objects were transmitted from the client device.

9. A computer adapted to identify referrer context information for links to remote objects, comprising:
    a processor for executing computer program modules; and
    a non-transitory computer-readable storage medium storing executable computer program modules comprising:
        a network inspection module configured to monitor network traffic received at a client device in a plurality of different protocols;

a remote object link identification module configured to identify in the network traffic links to remote objects, the links received via the plurality of different protocols, and to identify, using pattern matching, referrer context information within the monitored network traffic that is associated with the links to the remote objects, wherein types of referrer context information are specific to the protocols in which the links to the remote objects were received, different types of referrer context information are identified for links to remote objects received via different protocols, and the referrer context information comprises information allowing ascertainment of referrers that provided the network traffic containing the links to the remote objects to the client device;

a link storage module configured to store the links to the remote objects and the associated referrer context information; and a look up module configured to look up stored referrer context information associated with a link to a remote object in response to receiving a request for a source of the remote object triggered by detection of malicious code associated with the remote object.

10. The computer of claim 9, wherein the referrer context information comprises a user identification for a referrer of a link.

11. The computer of claim 9, wherein:

the network inspection module is further configured to monitor network traffic transmitted from the client device in the plurality of different protocols; and the remote object link identification module is further configured to identify in the network traffic transmitted via the plurality of different protocols links to remote objects and to identify referrer context information associated with the links to the remote objects and specific to the protocol in which the links to the remote objects were transmitted from the client device.

* * * * *